United States Patent
Christen et al.

(10) Patent No.: US 9,261,065 B2
(45) Date of Patent: Feb. 16, 2016

(54) OPERATING AN AUTOMATIC START-STOP SYSTEM

(71) Applicant: FORD GLOBAL TECHNOLOGIES, LLC, Dearborn, MI (US)

(72) Inventors: Urs Christen, Aachen (DE); Rainer Busch, Aachen (DE); Anthemios P. Petridis, Bishop's Stortford (GB); David Hesketh, Ingatestone (GB); Armin Mueller-Lerwe, Kerpen-Bergerhausen (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 66 days.

(21) Appl. No.: 13/945,012

(22) Filed: Jul. 18, 2013

(65) Prior Publication Data

US 2014/0088853 A1 Mar. 27, 2014

(30) Foreign Application Priority Data

Sep. 25, 2012 (DE) .......................... 10 2012 217 289

(51) Int. Cl.
*F02N 15/02* (2006.01)
*F02N 11/08* (2006.01)
*F02N 11/10* (2006.01)

(52) U.S. Cl.
CPC ............ *F02N 15/02* (2013.01); *F02N 11/0822* (2013.01); *F02N 11/103* (2013.01); *F02N 11/084* (2013.01); *F02N 2200/0802* (2013.01); *F02N 2200/0803* (2013.01); *F02N 2200/101* (2013.01); *F02N 2200/102* (2013.01); *F02N 2200/103* (2013.01); *Y02T 10/48* (2013.01)

(58) Field of Classification Search
CPC .. Y02T 10/48; F02N 11/0814; F02N 11/0818
USPC ................ 123/179.2, 179.3, 179.4; 701/112
See application file for complete search history.

(56) References Cited

U.S. PATENT DOCUMENTS

| | | | | |
|---|---|---|---|---|
| 3,731,108 | A * | 5/1973 | Kobara et al. ............... | 290/38 R |
| 4,402,286 | A * | 9/1983 | Pagel et al. ................ | 123/179.3 |
| 4,497,291 | A * | 2/1985 | Hamano et al. ............. | 123/179.4 |
| 4,500,794 | A * | 2/1985 | Hamano et al. ............. | 290/38 C |
| 4,510,396 | A * | 4/1985 | Uchida et al. ............... | 290/30 R |
| 4,555,006 | A * | 11/1985 | Uchida et al. ................ | 477/167 |
| 5,951,440 | A * | 9/1999 | Reichlinger ................. | 477/167 |
| 6,190,284 | B1 * | 2/2001 | Kuroda et al. ............... | 477/107 |
| 6,371,889 | B1 * | 4/2002 | Kuroda et al. ............... | 477/181 |

(Continued)

FOREIGN PATENT DOCUMENTS

| | | |
|---|---|---|
| DE | 102009012573 A1 | 9/2009 |
| EP | 1016810 B1 | 7/2000 |

*Primary Examiner* — Hieu T Vo
*Assistant Examiner* — Arnold Castro
(74) *Attorney, Agent, or Firm* — David B. Kelley; MacMillan, Sobanski & Todd, LLC

(57) ABSTRACT

A method for operating an automatic stop/start system in a motor vehicle with an internal combustion engine, a manually operated gearbox and a pedal-operated clutch, wherein the internal combustion engine is automatically stopped or restarted under predetermined conditions even with a gear engaged. The conditions under which the internal combustion engine is automatically restarted include two indicators that indicate that an automatic restart of the internal combustion engine is safe and desired, namely an indicator that indicates that a restart is safe and an indicator that indicates that the driver wants a restart.

13 Claims, 1 Drawing Sheet

(56) References Cited

U.S. PATENT DOCUMENTS

| | | | |
|---|---|---|---|
| 6,504,259 B1* | 1/2003 | Kuroda et al. | 290/40 C |
| 7,291,095 B2* | 11/2007 | Kitamura et al. | 477/181 |
| 7,347,175 B2* | 3/2008 | Lupo et al. | 123/179.4 |
| 7,354,379 B2* | 4/2008 | Moriya | 477/199 |
| 7,447,592 B2 | 11/2008 | Yopp et al. | |
| 7,860,637 B2* | 12/2010 | Yamaguchi | 701/112 |
| 2002/0074173 A1* | 6/2002 | Morimoto et al. | 180/65.2 |
| 2002/0145287 A1 | 10/2002 | Izumiura et al. | |
| 2009/0138184 A1* | 5/2009 | Terada | 701/112 |
| 2010/0217493 A1* | 8/2010 | Tomura et al. | 701/68 |
| 2010/0222973 A1* | 9/2010 | Senda et al. | 701/54 |
| 2011/0137543 A1 | 6/2011 | Gibson et al. | |
| 2011/0207579 A1 | 8/2011 | Liu et al. | |
| 2011/0295494 A1 | 12/2011 | Ma et al. | |
| 2012/0029796 A1* | 2/2012 | Chen | 701/113 |
| 2012/0083389 A1* | 4/2012 | Morita et al. | 477/185 |
| 2012/0196723 A1* | 8/2012 | Christen et al. | 477/167 |
| 2014/0081561 A1* | 3/2014 | Be et al. | 701/112 |
| 2014/0088853 A1* | 3/2014 | Christen et al. | 701/112 |

* cited by examiner

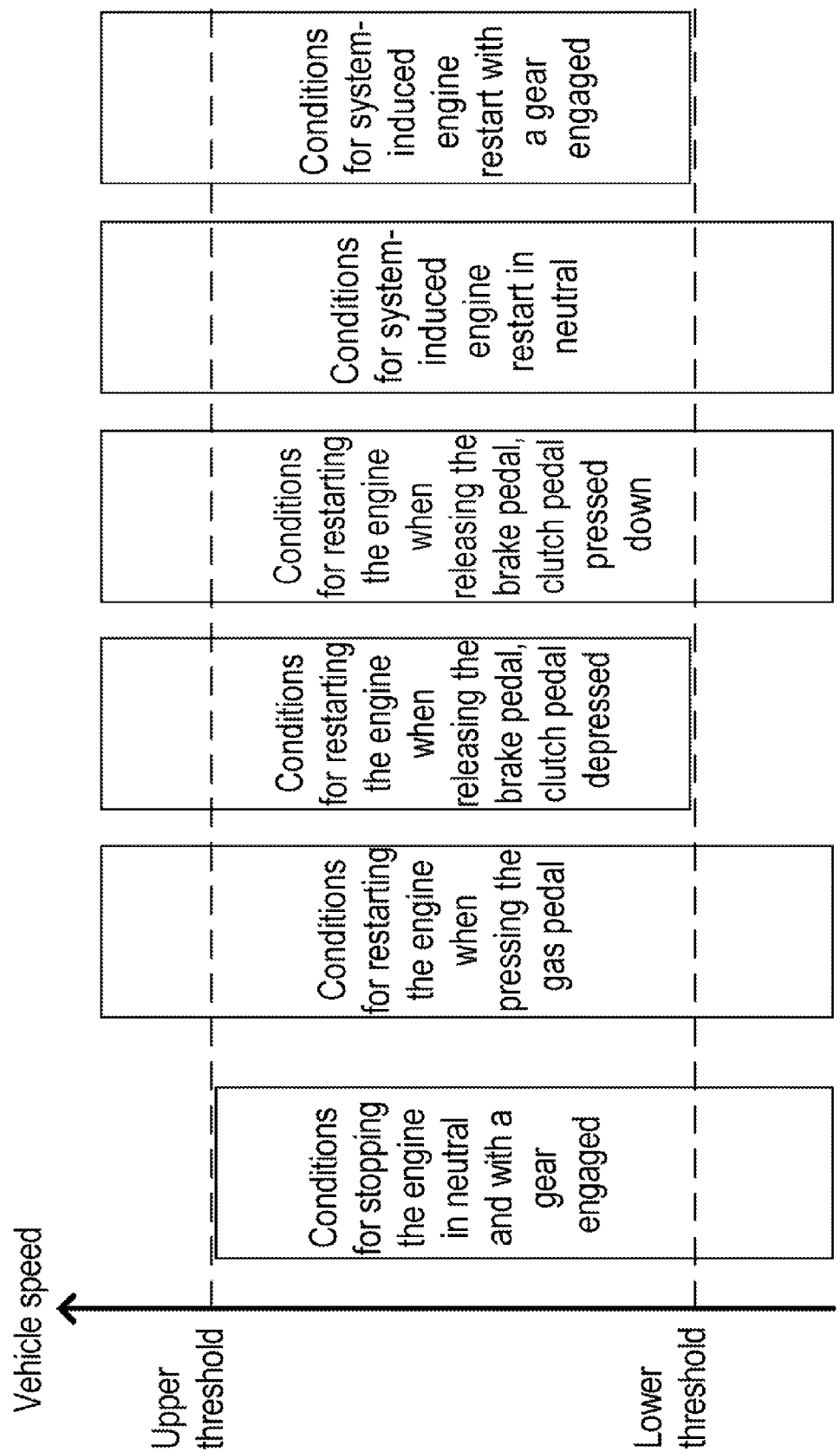

OPERATING AN AUTOMATIC START-STOP SYSTEM

BACKGROUND OF THE INVENTION

1. Field of the Invention

The invention relates to a method device for operating of an automatic start/stop system in a motor vehicle having an internal combustion engine, a manually operated gearbox and a pedal-operated clutch.

2. Description of the Prior Art

Micro hybrid vehicles and mild hybrid vehicles are motor vehicles with an internal combustion engine, a rather conventionally dimensioned electrical starter motor, an automatic stop/start system and a braking energy recovery system for charging a rather small starter battery. Using the automatic stop/start system the internal combustion engine can be automatically stopped, i.e. turned off, if no drive is required and can be started again if the driver demands power again. As a result, fuel consumption can be reduced.

There are two variants of the automatic stop/start system. The most common variant for motor vehicles with manually operated gearbox enables the stopping and restarting of the internal combustion engine only if the gearbox is in the neutral position (SIN; Stop In Neutral). With said variant the driver must select neutral, e.g. if he is approaching a traffic light at which he has to stop, to allow the automatic stop/start system to stop the internal combustion engine. However, not all drivers are in the habit of selecting neutral when they are approaching a red light, but they brake and would rather wait with gear engaged and clutch lever pressed down, so that the SIN automatic stop/start system cannot automatically stop the internal combustion engine. For said drivers a variant is more suitable that enables the stopping and restarting of the internal combustion engine with a gear engaged (SIG; Stop In Gear), and indeed not only when stationary but also at low vehicle speeds. SIG stops and starts are normally initiated if both the clutch pedal and also the brake pedal are depressed when in gear. SIG stops and starts may, however, only be carried out if the internal combustion engine is completely decoupled from the drive train.

DE 10 2009 012 573 A1 discloses a method for the operation of an automatic stop/start system in a motor vehicle with an internal combustion engine, a manually operated gearbox and a pedal-operated clutch, wherein the internal combustion engine is automatically stopped or restarted under predetermined conditions even with a gear engaged, wherein the conditions under which the internal combustion engine is automatically restarted include an indicator that indicates that an automatic restart of the internal combustion engine is safe and that is based on signals from a sensor that directly senses the position of a clutch piston and thus of the clutch plates and compares this with the so-called engagement point of the clutch, which has to be determined according to a complex method because the engagement point varies depending on a plurality of factors.

This and other known methods for the operation of an automatic stop/start system with a gear engaged all require a relatively complex sensing system, and moreover there are differences between the stop/start methods with the various SIN and SIG strategies, which takes some getting used to and is potentially irritating, especially for drivers using different motor vehicles with different stop/start-strategies.

SUMMARY OF THE INVENTION

A method for operating an automatic stop/start system in a motor vehicle with an internal combustion engine, a manually operated gearbox and a pedal-operated clutch, wherein the internal combustion engine is automatically stopped or restarted under predetermined conditions even with a gear engaged. The conditions under which the internal combustion engine is automatically restarted include two indicators that indicate that an automatic restart of the internal combustion engine is safe and desired, namely an indicator that indicates that a restart is safe and an indicator that indicates that the driver wants a restart. The indicator that indicates that a restart is safe is based on signals from two sensors, namely a sensor that senses whether the gearbox is in neutral and a sensor that directly senses the position of the clutch pedal.

The method provides a SIG strategy that provides a vehicle operator with great convenience with very low sensor system complexity.

A distinction is made for the stop/start conditions, both in the SIN strategy and also in the SIG strategy, between indicators that indicate that a restart or a stop is safe and indicators that indicate that a restart is desired or a stop is advantageous, as stopping the internal combustion engine is likely to save fuel. This enables both the SIN strategy and also the SIG strategy to be carried out using the same sensor equipment for control elements of the motor vehicle, and indeed very ergonomically in both cases, i.e. in a way in which a driver is not irritated.

In one preferred embodiment a stopped or stopping internal combustion engine is automatically restarted if either the clutch pedal is pressed down or the gearbox is in neutral as the indicator that indicates a restart is safe and if the gas pedal is depressed as the indicator that indicates that the driver wants a restart. Moreover, the stopped or stopping internal combustion engine is automatically restarted with a gear engaged if both the speed of the vehicle lies above a preset lower threshold and also the clutch pedal is depressed or pressed down as the indicator that indicates that a restart is safe, and moreover the position of the brake pedal changes from depressed to not depressed as the indicator that indicates that the driver wants a restart. The internal combustion engine is also automatically restarted if both the speed of the vehicle lies below the preset lower threshold and also the clutch pedal is pressed down as the indicator that indicates that a restart is safe and as an optional condition the parking brake is released, and if moreover, the position of the brake pedal changes from depressed to not depressed as the indicator that indicates that the driver wants a restart.

The terms "released" and "pressed down" used herein for pedal positions refer to the practically unloaded initial position and the end position at or near a stop, and the term "depressed" refers to any intermediate position between the initial and end positions.

In addition to SIN-induced and SIG-induced restarts, i.e. driver-induced restarts of the internal combustion engine, system-induced restarts are possible in general, i.e. restarts that are necessary as some subsystem of the motor vehicle can currently only be fully functional with a running internal combustion engine. Such system-induced restarts are preferably only enabled within the context of the invention if the gearbox is in neutral and the clutch pedal is released, or if the clutch pedal is pressed down and the speed of the vehicle lies above a preset lower threshold and as an optional condition the brake pedal is depressed.

In a preferred embodiment the conditions under which the internal combustion engine is automatically stopped include two indicators that indicate that an automatic stop of the internal combustion engine is safe and purposeful, namely an indicator that indicates that a stop is safe, and an indicator that indicates that a stop is purposeful, wherein the indicator that indicates that a stop is safe is based on the signals of the two sensors that directly sense the neutral position of the gearbox or the position of the clutch pedal.

Preferably, a currently running internal combustion engine is automatically stopped if each of first the internal combustion engine has been running for a preset time, secondly the gas pedal is released, thirdly the speed of the vehicle is below a preset upper threshold, fourthly the clutch pedal is released and fifthly the gearbox is in neutral.

Moreover, preferably a currently running internal combustion engine is automatically stopped if each of first the internal combustion engine has been running for a preset time, secondly the gas pedal is released, thirdly the speed of the vehicle is below a preset upper threshold, fourthly the clutch pedal is pressed down and fifthly the brake pedal is depressed.

The preset time during which the different conditions mentioned have to be fulfilled can be the same for all said conditions or they can be different for some or all conditions.

In order to implement the invention it is sufficient that the sensor that directly senses the position of the clutch pedal only detects whether the clutch pedal is released or depressed or is pressed down. This means that a significantly simpler sensor than a sensor that accurately detects the coupling state of the clutch, i.e. whether a predetermined torque is transferred or not, is sufficient. Accurate knowledge of the coupling state is not necessary with the invention, as an indicator that indicates that a restart or stopping is safe in cases in which a gear is currently selected is also based on information about the current speed of the vehicle. In certain speed ranges the internal combustion engine can be safely stopped or restarted, whereas this would be unsafe at other speeds.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawing, which shows vehicle speed ranges in which different conditions apply for stopping or restarting an internal combustion engine with an automatic stop/start system.

DESCRIPTION OF THE PREFERRED EMBODIMENT

For a motor vehicle with an internal combustion engine, a manually operated gearbox, a pedal-operated clutch and an automatic engine stop/engine restart system it is frequently required that two independent conditions must be fulfilled for a safe automatic restart of the internal combustion engine. For the common SIN strategy, the gearbox must be in neutral so that the drive train is open and so that there is no drive connection between the internal combustion engine and the vehicle wheels. If the driver depresses the clutch pedal, which also opens the drive train, an engine restart is initiated. Said redundancy in the restart conditions enables the use of relatively inexpensive sensors. Even if one of the sensors incorrectly indicates that the drive train is open, the engine restart can be carried out in a safe manner. And even if the driver accidentally touches the clutch pedal, e.g. when adjusting his seat, and immediately releases it again, a safe engine restart can still be carried out.

An automatic engine stop/engine restart system is herein referred to as a stop/start system or stop/start strategy.

A stop/start control strategy will now be described that does not assume that the driver changes to neutral before the internal combustion engine is restarted, which accommodates a larger percentage of all drivers. Said strategy only uses the set of sensors for control elements that is commonly present in motor vehicles with the SIN strategy. Said set of sensors includes:
  a neutral gear sensor that indicates whether the gearbox is in neutral;
  a gas pedal position sensor that indicates whether and possibly how far the gas or accelerator pedal is depressed;
  a clutch pedal position sensor that indicates the position of the clutch pedal, wherein information is sufficient as to whether the clutch pedal is in a released (not depressed) or in a depressed or in a pressed-down state.
  a brake pedal switch that indicates whether the brake pedal is depressed.

For many known SIG strategies, instead of the clutch pedal position sensor, a significantly more complex sensor would be necessary, which directly senses the position of the clutch plates instead of only sensing the pedal position.

The internal combustion engine is normally only automatically stopped if the motor vehicle is stationary or is moving at less than a speed far below the speed at which one can drive in the lowest gear, if the clutch is engaged and the internal combustion engine is idling, e.g. a vehicle speed below 3 km/h. Stop/start at these low speeds is known as SSS (Static Stop-Start).

RSS (Rolling Stop-Start) is a stop/start strategy that can also stop or restart the internal combustion engine at higher speed, e.g. up to vehicle speeds of 12 km/h, in order to maximize the time with the internal combustion engine stopped. In this case other considerations are important, e.g. as driving at idling revolution rate lies in this speed range. When driving at idling revolution rate the driver does not press on the gas pedal, but he regulates the drive force by modulating the clutch position by pressing on the clutch pedal to a greater or lesser extent. The idling speed regulator is thereby used to control the engine torque.

Some examples of different driving situations and a respective favorable stop/start strategy are described next.

Approaching a Traffic Light:
  Stop the internal combustion engine at a vehicle speed of 12 km/h if the driver opens the drive train (pushes the clutch pedal down or changes to neutral) and indicates the intention to stop by pressing on the brake pedal.
  Restart the internal combustion engine if the driver indicates that drive is required by any of releasing the brake pedal or depressing the accelerator pedal.
  Do not start the internal combustion engine prematurely if the driver engages a gear but shows no intention to set the motor vehicle in motion.
  In order to allow the driver's feet to rest while waiting, the driver may wish to release all pedals during the stopped phase.

Approaching an Intersection:
  Stop the internal combustion engine at a vehicle speed of 12 km/h if the driver opens the drive train and pushes on the brake pedal.
  Restart the internal combustion engine early or abort stopping if the driver indicates that driving is required.

Approaching Traffic Congestion:
  Stop the internal combustion engine if the driver opens the drive train fully and indicates an intention to stop by pressing on the brake pedal.
  Restart the internal combustion engine if the driver removes his foot from the brake pedal; while the motor vehicle is still moving, also restart if the driver is modulating the clutch position. This allows driving at idling revolution rate.
  Restart the internal combustion engine if the driver indicates that driving is required.
System-Induced Restarts:
  If the gearbox is in neutral with the clutch pedal released (so that rapid changes cannot occur), the internal combustion engine can be safely restarted if a subsystem of the motor vehicle, such as e.g. an air conditioning system, a vacuum brake booster and similar requires power from the internal combustion engine.
  If a gear is engaged with the clutch pressed down, the internal combustion engine may only be restarted if the motor vehicle is not at rest. In a rolling motor vehicle the driver is normally alert and is thus not surprised by a restart, which could clash with releasing the clutch pedal with the motor vehicle at rest.

For a detailed description of the conditions for stopping or starting the internal combustion engine, the signal status of different sensors are introduced as follows:

|  | Name | Signal status | Meaning |
|---|---|---|---|
| gas pedal | acceleration status | POS_TQ | driver demands positive torque at the flywheel |
|  |  | NEG_TQ | driver demands negative (or zero) torque at the flywheel |
| brake pedal | brake status | RELEASED | brake pedal is not depressed |
|  |  | DEPRESSED | brake pedal is depressed |
| clutch pedal | clutch status | RELEASED | clutch pedal is released to the extent that the clutch is engaged |
|  |  | DEPRESSED | clutch pedal is depressed, but the clutch may not be disengaged |
|  |  | PRESSED DOWN | clutch pedal is depressed to the extent that the clutch is disengaged |
| gearbox | gearbox status | NEUTRAL | gearbox is in neutral |
|  |  | GEAR ENGAGED | gearbox is not in neutral |
| internal combustion engine | engine status | RUNNING | engine is running |
|  |  | STOPPING | engine is thereby to be stopped, but has not yet been stopped |
|  |  | STOPPED | engine has been stopped |

A. Conditions for Stopping the Internal Combustion Engine
  There are basically two possibilities for initiating the stopping of the internal combustion engine. One is traditional stopping if the gearbox is in neutral. The other is stopping with a gear engaged.
1. Stopping Engine with Gearbox in Neutral:
  If all the following conditions are fulfilled for a preset time:
    engine status is RUNNING
    clutch status is RELEASED
    gearbox status is NEUTRAL
    acceleration status is NEG_TQ
    speed of the vehicle is below an upper threshold value (for RSS)
  the internal combustion engine is to be stopped.
2. Stopping Engine with Gear Engaged:
  If all the following conditions are fulfilled for a preset time, wherein this time can be different than for stopping the engine with the gearbox in neutral:
    engine status is RUNNING
    acceleration status is NEG_TQ
    speed of the vehicle is below the upper threshold value (for RSS)
    clutch status is PRESSED DOWN
    brake status is DEPRESSED
  the internal combustion engine is to be stopped.

The above two stopping conditions apply both to RSS and to SSS, so that the driver does not detect any speed-dependent change of stopping behavior. In both cases there are two indicators that the driver is not actually demanding drive so soon. For stopping the engine with the gearbox in neutral, the driver has changed to neutral and has released the clutch pedal, which indicates that he is not in the middle of a change process, but intends to remain in neutral for some time. For stopping the engine with a gear engaged the driver has, by pressing down the clutch pedal, disengaged the drive train and simultaneously operated the vehicle brakes, which indicates that he actually wishes to go slower and is not demanding a drive force.

B. Conditions for Starting the Internal Combustion Engine
1. Starting Engine when Pressing on the Gas Pedal
  If all the following conditions are fulfilled:
    engine status is STOPPED or STOPPING
    clutch status is PRESSED DOWN or gearbox status is NEUTRAL
    acceleration status is POS_TQ
  the internal combustion engine is to be restarted.
2. Starting Engine when Releasing the Brake Pedal
  If all the following conditions are fulfilled:
    engine status is STOPPED or STOPPING
    speed of the vehicle is above a lower threshold value (for SSS)
    gearbox status is GEAR ENGAGED
    clutch status is not RELEASED
    brake status changes to RELEASED;
  or if all the following conditions are fulfilled:
    engine status is STOPPED or STOPPING
    speed of the vehicle is below the lower threshold value (for SSS)
    gearbox status is GEAR ENGAGED
    clutch status is PRESSED DOWN
    optional: parking brake is released
    brake status changes to RELEASED
  the internal combustion engine is to be restarted.
  In order to allow driving at idling revolution rate, the internal combustion engine is restarted on releasing the brake pedal; for a speed above stationary it is even restarted if the clutch status is not PRESSED DOWN but is only DEPRESSED.

For driver-induced restarts it is generally the first rule that the internal combustion engine is started if the driver operates the gas pedal. This condition includes so-called heel and toe starts, with which the driver has his heel on the brake pedal, then presses on the gas pedal with his toes and then releases the brake pedal.

In order to allow driving at idling revolution rate, i.e., engine idle speed, wherein the driver does not touch the gas pedal, restarts are also initiated if the brake pedal is released (transition from DEPRESSED to RELEASED). When stationary, the clutch pedal must be pressed down in order to avoid unintended movement of the motor vehicle; optionally, the status of the parking brake could be checked: if the parking brake is applied, the driver is not intending to drive at idling revolution rate. At higher vehicle speeds a restart should also be initiated if the driver is already modulating the clutch position and the clutch has reached the DEPRESSED status. Because the motor vehicle is moving anyway and the driver is moving the clutch towards the engaged position, the driver is prepared for changes of the speed of the vehicle.

It is generally considered to not allow restarts on releasing the brake pedal when stationary (i.e. for vehicle speeds below the lower threshold). In such a case the restart would only be available on pressing the gas pedal once said low vehicle speeds are reached. At least for gasoline engines, which have lower torque than diesel engines at low engine revolution rates, the driver has to press the gas pedal anyway so that the motor vehicle accelerates.

As mentioned above, the driver might release all the pedals during the stopped phase. In such a case the driver usually removes his feet simultaneously from the clutch and brake pedals. However, this does not actually happen effectively simultaneously, but with a small delay between releasing the two pedals. If the clutch pedal is in the DEPRESSED or RELEASED position before the brake pedal reaches the RELEASED position, the internal combustion engine remains stopped. On the other hand, if the brake pedal reaches the RELEASED position before the clutch pedal has left the PRESSED DOWN position, a restart is initiated, which has to be aborted if the clutch pedal moves towards DEPRESSED before the internal combustion engine is running properly.

3. System-Induced Engine Starts

If all the following conditions are fulfilled:
  engine status is STOPPED or STOPPING
  gearbox status is NEUTRAL
  clutch status is RELEASED
  demand for a running internal combustion engine
or if all the following conditions are fulfilled:
  engine status is STOPPED or STOPPING
  clutch status is PRESSED DOWN
  speed of the vehicle is above the lower threshold value (for SSS)
  optional: brake status is DEPRESSED
  demand for a running internal combustion engine
the internal combustion engine is to be restarted.

System-induced restarts with a gear engaged are possibly also not initiated if the motor vehicle is stationary and if the brake pedal is released.

There are various subsystems in the motor vehicle that can demand a restart of the internal combustion engine. Clear cases are the battery—if it is discharged the internal combustion engine must be restarted before it is too late to do so—, a vacuum brake booster or an air conditioning system. But also if the motor vehicle starts to roll or to accelerate down a downhill street, it can be advantageous to restart the internal combustion engine early so that all subsystems are immediately fully functional if necessary.

While the gearbox is in neutral (and the clutch pedal is released, so that the clutch is not currently in a transition state), the internal combustion engine can always be safely restarted. If a gear is engaged in the gearbox, the driver must keep the clutch pedal pressed down while the motor vehicle is moving; under these conditions it is safe to restart the internal combustion engine if a demand for a running internal combustion engine is received. For a stationary motor vehicle, however, it can be the case that the driver releases the clutch pedal at the time at which a demand for a running internal combustion engine is received from a subsystem; a restart of the internal combustion engine could then lead to an unintentional vehicle movement. It can thus additionally be required in this case that the driver presses on the brake pedal so that a system-induced restart is initiated if a gear is engaged. Moreover, it can be advantageous to ensure that system-induced restarts can only occur if the driver is in the motor vehicle.

As described, some of the conditions for stopping or restarting the internal combustion engine are based on the current speed of the vehicle. This means that the conditions described above for stopping or restarting the internal combustion engine are active in certain speed ranges. This is illustrated in the FIGURE. At the limits of the speed ranges, there can be a hysteresis to prevent switching back and forth between different stop/start methods, which could irritate the driver.

In accordance with the provisions of the patent statutes, the preferred embodiment has been described. However, it should be noted that the alternate embodiments can be practiced otherwise than as specifically illustrated and described.

The invention claimed is:

1. A method for operating an automatic stop/start system in a vehicle, comprising:
   (a) automatically stopping an internal combustion engine while a manual transmission gear is selected, provided a vehicle speed is below a predetermined threshold, a clutch pedal is depressed and a brake pedal is depressed;
   (b) automatically restarting the internal combustion engine while the gear is selected and the clutch pedal is depressed, provided the brake pedal is released and the vehicle speed is above a predetermined non-zero threshold.

2. The method as claimed in claim 1, further comprising:
   (c) automatically restarting the internal combustion engine when the clutch pedal is released, provided a transmission is in neutral, and a gas pedal is depressed.

3. The method as claimed in claim 1, further comprising:
   (c) automatically restarting the internal combustion engine while the gear is engaged, provided the vehicle speed is below a preset threshold, a parking brake is released, and the brake pedal changes from depressed to released.

4. The method as claimed in claim 1, further comprising:
   (c) automatically restarting the internal combustion engine in response to a demand from a subsystem of the vehicle for a running engine, provided:
   a manual transmission is in neutral and the clutch pedal is released.

5. The method as claimed in claim 1, further comprising:
   (c) automatically restarting the internal combustion engine in response to a demand from a subsystem of the vehicle for a running engine, provided:
   the clutch pedal is depressed, the vehicle speed is above a preset non-zero lower threshold, and the brake pedal is depressed.

6. The method as claimed in claim 1, further comprising:
(c) automatically stopping the internal combustion engine when the clutch pedal is released, provided a transmission is in neutral and the vehicle speed is below an upper threshold value.

7. The method as claimed in claim 1, further comprising:
(c) automatically stopping the internal combustion engine, provided the internal combustion engine has been running for a preset time, a gas pedal is released, the vehicle speed is below a preset upper threshold, the clutch pedal is released, and a transmission is in neutral.

8. The method as claimed in claim 1, further comprising:
(c) automatically stopping the internal combustion engine, provided the internal combustion engine has been running for a preset time, a gas pedal is released, the vehicle speed is below a preset upper threshold, the clutch pedal is pressed down, and a brake pedal is depressed.

9. The method as claimed in claim 1, wherein the indication of a position of the clutch pedal indicates only whether the clutch pedal is released or depressed.

10. The method as claimed in claim 1, further comprising:
(c) automatically restarting the internal combustion engine while the gear is selected, provided the vehicle speed is below a preset threshold, a parking brake is released, the clutch pedal is depressed and the brake pedal changes from depressed to released.

11. A method for operating an automatic stop/start system in a vehicle, comprising:
(a) automatically restarting an automatically stopped internal combustion engine while a manual transmission gear is selected and a clutch pedal is depressed, provided a brake pedal is released and a speed of the vehicle is above a predetermined non-zero threshold;
(b) automatically restarting the automatically stopped internal combustion engine in response to a demand from a subsystem of the vehicle for a running engine provided, the clutch pedal is depressed, the vehicle speed is above a preset non-zero lower threshold, and the brake pedal is depressed.

12. A method for operating an automatic stop/start system in a vehicle, comprising:
(a) automatically restarting an automatically stopped internal combustion engine while a manual transmission gear is selected and a clutch pedal is depressed, provided a brake pedal is released and a speed of the vehicle is above a predetermined non-zero threshold;
(b) automatically restarting the automatically stopped internal combustion engine while the gear is selected, provided the vehicle speed is below a preset threshold, a parking brake is released, the clutch pedal is depressed and the brake pedal changes from depressed to released.

13. A method for operating an automatic stop/start system in a vehicle, comprising:
automatically restarting an automatically stopped internal combustion engine while a manual transmission gear is selected and a clutch pedal is depressed, provided a brake pedal is released and a speed of the vehicle is above a predetermined non-zero threshold, and wherein the indication of a position of the clutch pedal indicates only whether the clutch pedal is released or depressed.

\* \* \* \* \*